US009065901B2

(12) United States Patent
Mackey et al.

(10) Patent No.: US 9,065,901 B2
(45) Date of Patent: Jun. 23, 2015

(54) ELECTRONIC COMMUNICATION DEVICES WITH INTEGRATED MICROPHONES

(75) Inventors: Christopher D. Mackey, Spencerport, NY (US); Scott E. Bartholomew, Webster, NY (US); Anthony R. A. Keane, Webster, NY (US); Bryce Tennant, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 517 days.

(21) Appl. No.: 13/540,663

(22) Filed: Jul. 3, 2012

(65) Prior Publication Data

US 2014/0010383 A1    Jan. 9, 2014

(51) Int. Cl.
*H04M 1/00* (2006.01)
*H04M 1/23* (2006.01)
*H04M 1/03* (2006.01)
*H04B 1/3827* (2015.01)

(52) U.S. Cl.
CPC ............ *H04M 1/233* (2013.01); *H04B 1/3833* (2013.01); *H04M 1/03* (2013.01)

(58) Field of Classification Search
USPC ............... 379/390.01, 433.01–433.07; 701/2; 324/207.25; 455/564, 550.1, 455/575.1–575.8; 381/71.1; 343/702
See application file for complete search history.

(56) References Cited

U.S. PATENT DOCUMENTS

| | | | |
|---|---|---|---|
| 5,930,352 A * | 7/1999 | Hiraiwa | 379/390.01 |
| 6,792,291 B1 * | 9/2004 | Topol et al. | 455/564 |
| 7,352,174 B1 * | 4/2008 | Lee | 324/207.25 |
| 2004/0012531 A1 | 1/2004 | Toda | |
| 2005/0273218 A1 * | 12/2005 | Breed et al. | 701/2 |
| 2006/0084465 A1 | 4/2006 | Kim | |
| 2010/0216526 A1 | 8/2010 | Chen et al. | |

FOREIGN PATENT DOCUMENTS

CA    2296011    7/2001

OTHER PUBLICATIONS

International Preliminary Report on the Patentability mailed Jan. 15, 2015 Application Serial No. PCT/US2013/048555 in the name of Harris Corporation.

* cited by examiner

*Primary Examiner* — Md S Elahee
(74) *Attorney, Agent, or Firm* — Robert J. Sacco, Esq.; Fox Rothschild LLP

(57) ABSTRACT

Modern electronic devices are becoming smaller while the need to critically locate acoustic sensors or transducers, e.g., microphones, is increasing in order to provide improved intelligibility in adverse environments. The acoustic transducers can be used in arrays with their outputs processed in beam forming and noise cancellation algorithms. The use and creation of features on the surface of a small package to deal with the problem of achieving high performance solutions in a limited space are disclosed herein. For example, embodiments of electronic communication devices (10) include acoustic transducers (26) integrated with other features such as a volume control (34, 50), an antenna (87, 260, 280), an adapter (300) which can be coupled to an input/output jack (90) and an accessory connector, or a projection (98).

34 Claims, 16 Drawing Sheets

ELECTRONIC COMMUNICATION DEVICES WITH INTEGRATED MICROPHONES

BACKGROUND OF THE INVENTION

1. Statement of the Technical Field

The inventive arrangements in this patent disclosure relate to electronic devices, such as hand-held radios, that require one or more microphones or other types of acoustic transducers.

2. Description of the Related Art

The components of many electronic communication devices, such as hand-held land mobile radios, are densely packaged in order minimize their overall dimensions, while maximizing the performance and functionality thereof. The number of suitable mounting locations for acoustic transducers, such as microphones, on such devices is usually limited. In particular, an acoustic transducer generally needs to be mounted on an external face of the device. Moreover, the suitability of a particular face for use in accommodating an acoustic transducer is dependent upon whether the face will be covered during normal use of the device. For example, a face that will be covered by a holster, a coat pocket, or a mounting bracket during normal use of the device is generally an unsuitable location for mounting an acoustic transducer.

Also, technological developments such as active noise cancellation, sound localization, and sound isolation can necessitate the use of arrays of two or more acoustic transducers. The relative locations and the orientations of the acoustic transducers used in such applications are often critical factors in achieving the desired performance from the acoustic-transducer system. The use of multiple acoustic transducers, which need to be positioned in specific relative locations and orientations, is at odds with the limited availability of suitable mounting locations for acoustic transducers on many electronic communication devices.

SUMMARY OF THE INVENTION

Embodiments of electronic devices include a shell; a rotary control; and an acoustic transducer co-located with the rotary transducer on the shell.

Further embodiments of electronic communication devices include a shell; and an input device mounted on or extending through the shell. The input device includes a first portion having a control configured to generate an output that causes a response in a component of the electronic communication device. The input device also includes a second portion mounted on or coaxially with the first portion and comprising an acoustic transducer.

In accordance with a further aspect of the claimed inventive concepts, input devices include a first portion having a rotary control configured to generate an electrical output responsive to a rotational input thereto; and a knob mounted on the rotary control and configured to provide the rotational input to the rotary control. The embodiments further include a second portion mounted on or co-axially with the first portion and comprising an acoustic transducer; and a rotating platform having a base and a carousel configured to rotate in relation to the base and the rotary control. The acoustic transducer is configured to rotate with the carousel. The acoustic transducer can be configured to be non-rotatable in relation to the carousel in alternative embodiments.

In accordance with a further aspect of the claimed inventive concepts, embodiments of radios include a shell, and an input device. The input device includes a first portion having a rotary control configured to generate an electrical output responsive to a rotational input thereto; and a knob mounted on the rotary control and configured to provide the rotational input to the rotary control. The input device also includes a second portion mounted on or co-axially with the first portion. The second portion includes an acoustic transducer, and a rotating platform having a base and a carousel configured to rotate in relation to the base and the rotary control. The acoustic transducer is configured to rotate with the carousel. The radios may include a speaker mounted on or within the shell, and an amplifier communicatively coupled to the first portion of the input device and the speaker. The amplifier is operable to generate an electrical output that drives the speaker in response to an electrical output of the first portion of the input device.

BRIEF DESCRIPTION OF THE DRAWINGS

Embodiments will be described with reference to the following drawing figures, in which like numerals represent like items throughout the figures and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
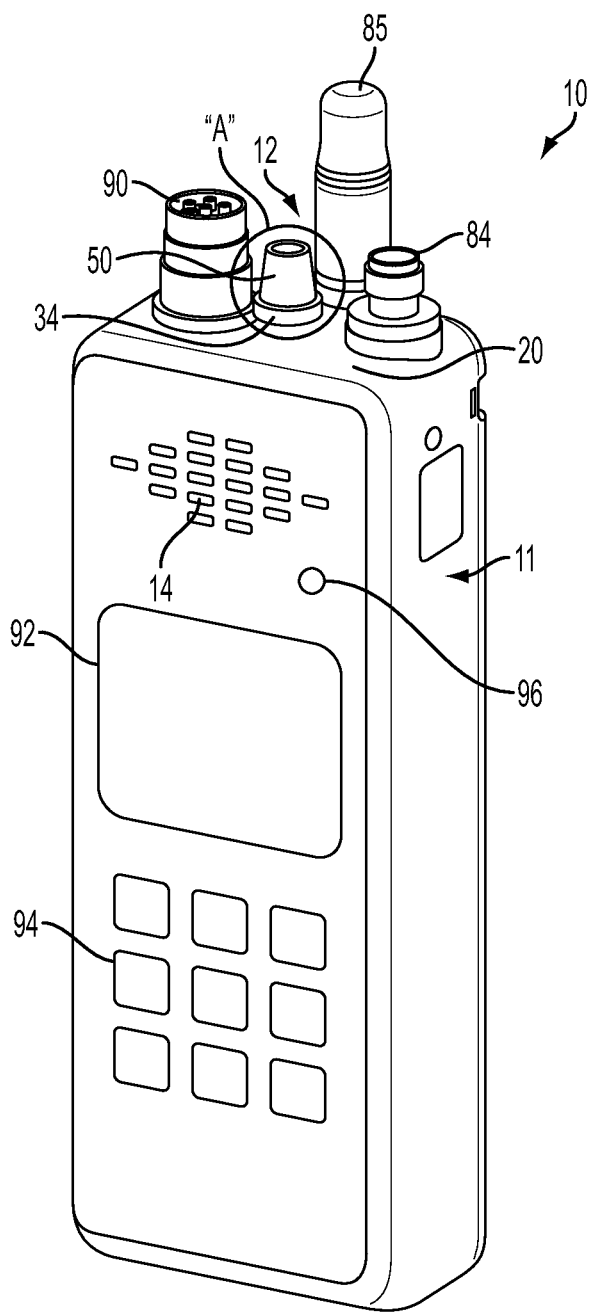
FIG. 1 is a perspective view of a radio having an integrated volume control and microphone device.

FIGS. 1-5 depict a portable electronic communication device in the form of a hand-held transceiver or radio 10. The radio 10 can be configured, for example, as a land mobile radio. The radio 10 comprises a housing or shell 11 formed from an impact-resistant material such as high-impact plastic, and a speaker 14 mounted within the shell 11 as shown in FIG. 1.

Figure 5:
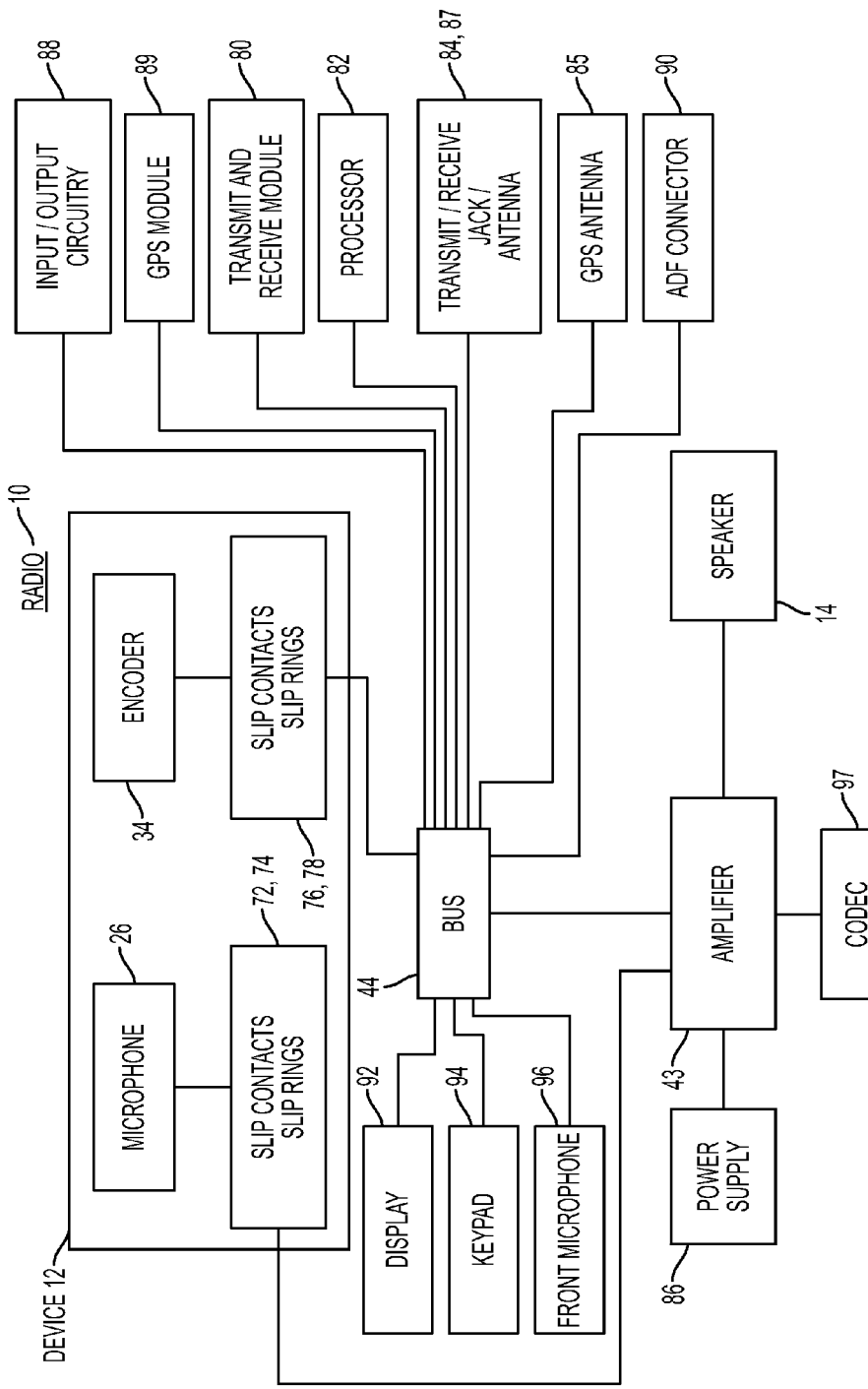
FIG. 5 is a schematic illustration of various electrical components of the radio and the integrated volume control and microphone device shown in FIGS. 1-4.

As depicted in FIG. 5, the radio 10 also includes a transmit and receive module 80 configured to facilitate the transmission and reception of radio frequency (RF) signals; a processor 82; a transmit/receive antenna jack 84 and antenna 87; a global positioning system (GPS) antenna 85; a power supply 86; input/output circuitry 88; a GPS module 89; an input/output jack 90 that is configured to mate with an accessory connector (not shown); a display 92; a keypad 94; a front microphone 96; a codec 97; and a bus 44 that facilitates communication between components. It should be noted that the schematic illustration of FIG. 5 is not intended to be a complete depiction of all of the electrical and electronic components of the radio 10.

Figure 2:
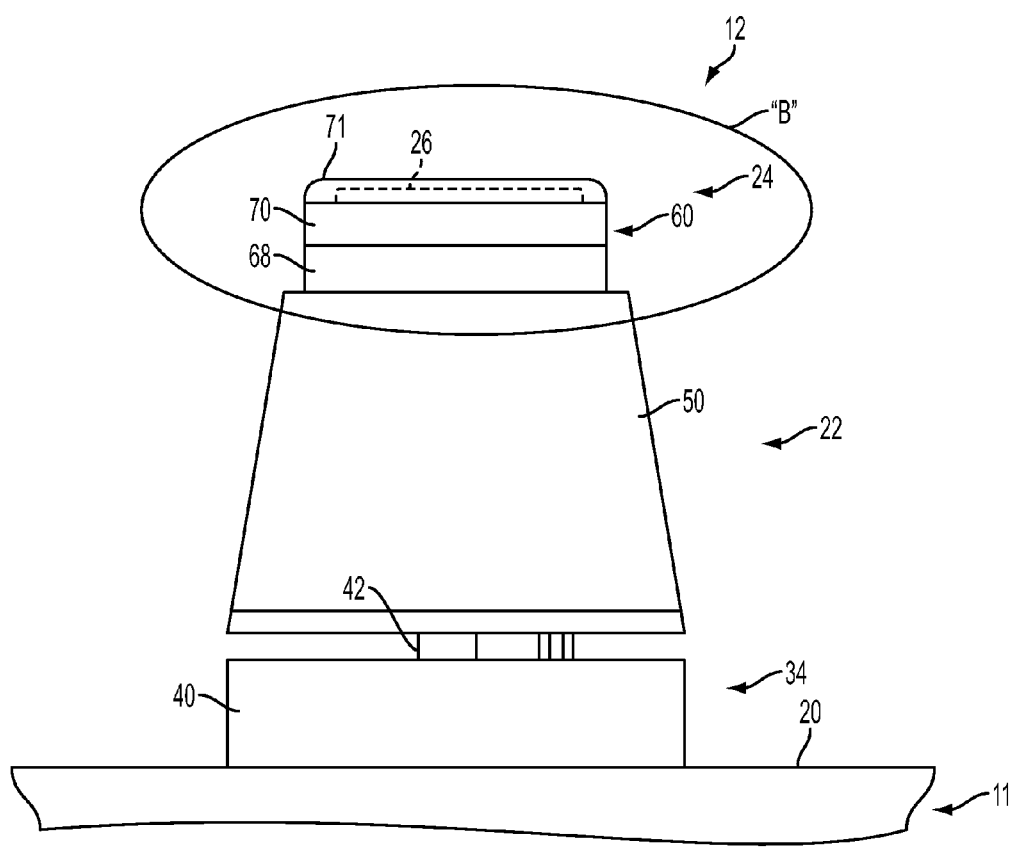
FIG. 2 is a magnified side view of the area designated "A" in FIG. 1.
Figure 3:
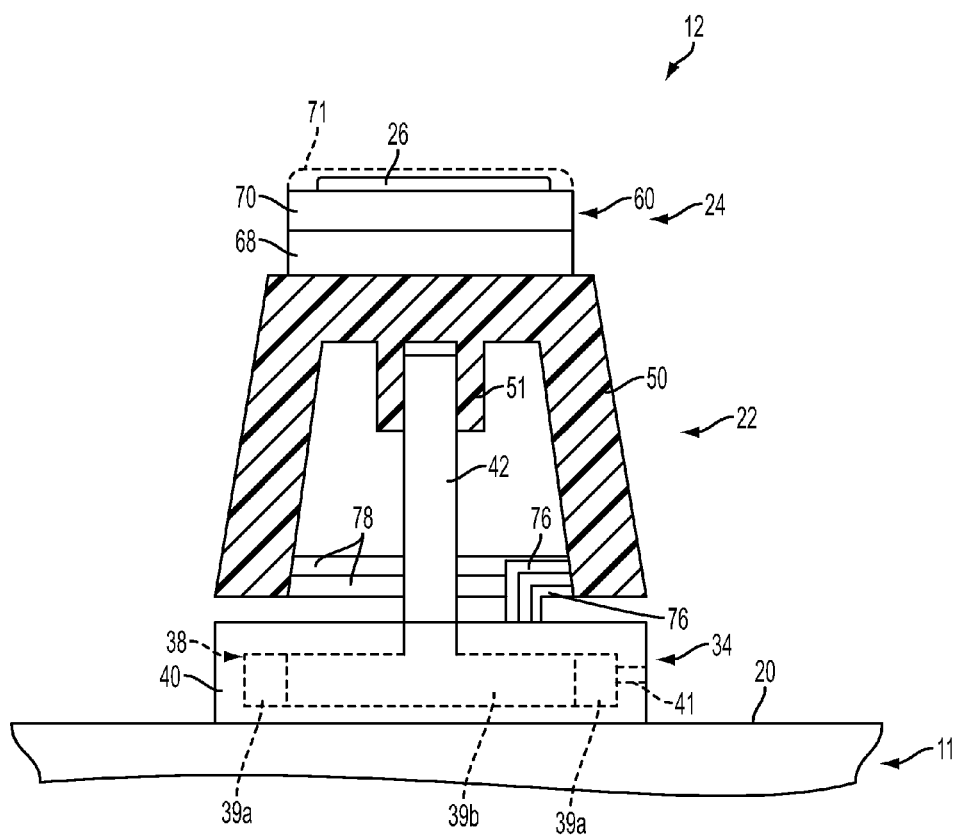
FIG. 3 is a magnified side view of the area designated "A" in FIG. 1, depicting a knob of the integrated volume control and microphone device in cross section.

The radio 10 also includes an input device in the form of an integrated volume control and microphone device 12. The device 12 is mounted on a top surface 20 of the shell 11 as depicted in FIG. 1, and includes a first portion 22 and a second portion 24 as shown in FIGS. 2 and 3. Alternatively, the device 12 can be mounted on structure, such as an internal chassis for frame, located within the shell 11, as opposed to being mounted on the shell 11 itself. In such applications, the device 12 can extend through the shell 11 via an opening formed therein. The first and second portions 22, 24 are co-located in relation to the shell 11, i.e., the first and second portions 22, 24 are positioned over the same location on the shell 11 or, alternatively, are positioned over the same opening in the shell 11.

The first portion 22 facilitates control of the volume of the speaker 14. The second portion 24 comprises an acoustic transducer in the form of a microphone 26 that facilitates voice and other audio inputs to the radio 10. The second portion 24 of the device 12 is configured so that the microphone 26 can be rotated independently in relation to the first portion 22 and the shell 11. The microphone 26 can thus be positioned in an optimum orientation in relation to a sound source being picked-up or transduced, by the microphone 26. The device 12 is described in connection with a hand-held land mobile radio 10 for exemplary purposed only. The device 12, and alternative embodiments thereof, can be used as part of other types of mobile and non-mobile electronic devices.

The use of a microphone 12 as the acoustic transducer on the device 12 is disclosed for exemplary purposes only. Other types of acoustic transducers, such as optical, ultrasonic, and vibration sensors, can be used in the alternative. Also, alternative embodiments of the radio 10 can be equipped with a second microphone. The microphone 12 and the secondary microphone can be used, for example, as primary and secondary microphones (or vice versa) for the purpose of noise cancellation.

The first portion 22 of the device 12 comprises a rotary control in the form of a rotary encoder 34. The rotary encoder 34 is a mechanical absolute rotary encoder. Other types of position sensors, such as optical rotary encoders, can be used in the alternative. The rotary encoder 34 generates an electrical output representative of the user-selected volume setting for the speaker 14.

The rotary encoder 34 includes a cylindrical casing 40 and a spindle 42, as illustrated in FIGS. 2 and 3. The rotary encoder 34 also includes a plurality of electrical contacts 41 depicted in phantom in FIG. 3. The contacts 41 are fixed to an interior surface of the casing 40, and extend radially inward. The contacts 41 have different respective lengths. The casing 40 is securely mounted on the top surface 20 of the shell 11 by a suitable means such as fasteners. A first portion of the spindle 42, shown in phantom in FIG. 3, is located within the casing 40, and a second portion of the spindle 42 protrudes from the casing 40.

The rotary encoder 34 also includes a disc 38, depicted in phantom in FIG. 3. (not shown). The disc 38 has an electrically-insulative inner circumferential portion 39a that is fixed to a bottom end of the spindle 42, and an electrically-conductive outer circumferential portion 39b. The outer circumferential portion 39b has a series of cut-outs (not visible in FIG. 3) of different depths, or radial dimensions, formed along its outer periphery. The disc 38 is mounted for rotation within the casing 40, and the outer circumferential portion 39b is subjected to an electrical potential. As the disc 38 rotates, different combinations of the contacts 41 come into contact with the outer circumferential portion 39b. The contacts 41 in contact with the disc register the voltage potential of the outer circumferential portion 39b. The specific combination of contacts 41 registering contact with the disc 38 when the disc 38 is located at a particular angular position is unique to that position, and can thus be used as an indication of the angular position of the spindle 42.

The rotary encoder 34 is electrically connected to an amplifier 43 of the radio 10 via the bus 44, so that the amplifier 43 receives the output of the rotary encoder 34. The amplifier 43 and bus 44 are depicted schematically in FIG. 5. The amplifier 43 is configured to recognize the various combinations of energized contacts 41 with the disc 38 of the rotary encoder 34 as indicative of the angular position of the spindle 42. The amplifier 43 is electrically connected to the speaker 14, and generates an electrical output that drives the speaker 14. The amplifier 43 is configured so that its power output, and the resulting volume of the speaker 14, vary in response to the position signal from the rotary encoder 34.

A knob 50 is securely mounted on the upper or second portion of the spindle 42, as shown in FIGS. 2 and 3. The knob 50 is secured to the spindle 42 by an interference fit between the end of the spindle 42 and a sleeve 51 on the knob 50. Other suitable retaining means, such as fasteners and/or adhesive, can be used in addition to, or in lieu of an interference fit.

The user can vary the volume of the speaker 14 by rotating the knob 50. In particular, because the knob 50 is secured to the second portion of the spindle 42, rotation of the knob 50 imparts a corresponding rotation to the spindle 42, which in turn results in a change in the output of the rotary encoder 34 and a corresponding change in the volume of the speaker 14. The knob 50 can include numerical markings (not shown) denoting various volume levels. A reference mark (also not shown) can be placed on the top surface 20 of the shell 11. The reference mark and the numerical markings on the knob 50 can provide the user with a visual indication of the volume setting for the speaker 14.

Figure 4:
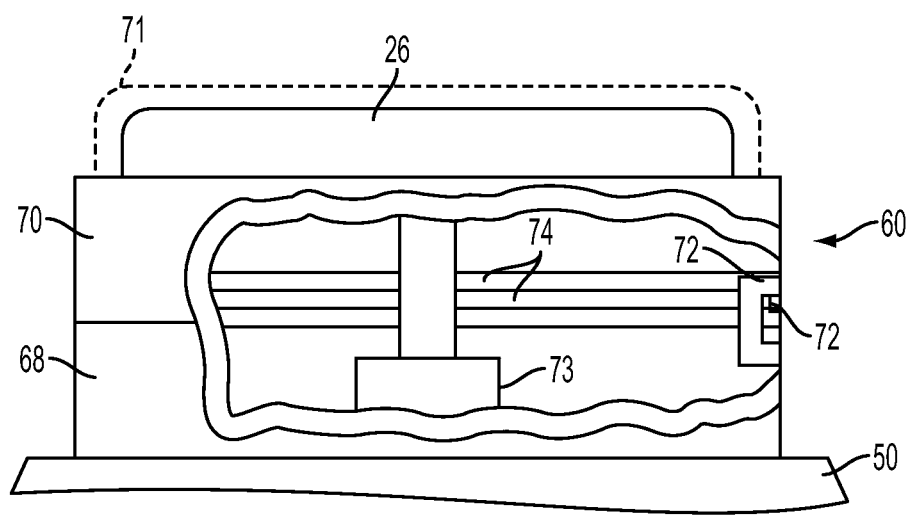
FIG. 4 is a magnified side view of the area designated "B" in FIG. 2, depicting a rotating platform of the integrated volume control and microphone device in partial cut-away.

The second portion 24 of the device 12 includes a rotating platform 60, and a microphone 26 mounted on the rotating platform 60, as illustrated in FIGS. 2-4. The microphone 26 is a surface-mount microelectromechanical systems (MEMS) microphone. The microphone 26 can include, for example, a flexible, pressure-sensitive diaphragm or membrane (not shown), and a fixed back plate (also not shown) that faces, and is spaced apart from the diaphragm. The diaphragm and the back plate, when electrically charged, act as a capacitor. The diaphragm is deflected by sound pressure, which produces a corresponding change in capacitance of the diaphragm. The change in capacitance of the diaphragm results in a corresponding change in the voltage across the diaphragm and the back plate, which can be correlated to the sound pressure level.

The microphone 26 has a unidirectional cardioid pick up pattern, so that the sensitivity of the microphone 26 is higher over a first, or front half thereof than over a second, or back half thereof. This feature helps to minimize the pick up of ambient sounds during operation of the microphone 26. Microphones other than MEMS microphones, such as electret condenser microphones, can be used in lieu of the microphone 26. Moreover, microphones having pick-up patterns other than unidirectional, such as omnidirectional and bidirectional patterns, can be used instead of the microphone 26. A microphone suitable for use as the microphone 26 can be obtained, for example, from Analog Devices Inc. as the ADMP401 model MEMS microphone.

The rotating platform 60 allows the user to adjust the angular position of the microphone 26 independently of the angular position of the knob 50, so that the acoustically-sensitive front half of the microphone 26 can face the user when the radio 10 is in a particular orientation in relation to the user. The rotating platform 60 includes a base 68 that is securely mounted on a top surface of the knob 50 by a suitable means such as adhesive, as depicted in FIG. 4. The rotating platform 60 also includes a carousel 70 that is mounted for rotation on the base 68 via a bearing 73. The microphone 26 is securely mounted on the carousel 70 using a suitable means such as adhesive. The microphone 26 can thus rotate in relation to the knob 50 and the shell 11. Means other than the rotating platform 60 can be used in alternative embodiments to facilitate relative rotational movement between the microphone 26 and the knob 50.

A protective cover 71 for the microphone 26 is mounted on the carousel 70 of the rotating platform 60, as shown in FIGS. 2-4. The cover 71 can be formed from an impact resistant material such as high-impact plastic, and can have holes formed therein to facilitate the passage of sound therethrough. The cover 71 can include reference marks (not shown) that provide the user with a visual indication of the location of the acoustically-sensitive front half of the microphone 26.

Signals can be transmitted between the microphone 26 and electrically-conductive leads (not shown) mounted on an interior surface of the knob 50 by way brushes or slip contacts 72 mounted on the base 68 of the rotating platform 60, and slip rings 74 mounted on the carousel 70, as depicted in FIGS. 4 and 5. The signals can be transmitted between the electrically-conductive leads on the knob 50, and the shell 11 of the radio 10 via brushes or slip contacts 76 mounted on the top surface 20 of the shell 11, and slip rings 78 mounted on the interior surface of the knob 50 as shown in FIG. 3. Signals can be transmitted between the knob 50 and the shell 11 using alternative means such as a simple twisting wire structure, acoustic coupling, optical coupling, and RF coupling.

During use of the radio 10, the user can rotate the knob 50 to adjust the volume of the speaker 14 to a desired level, as discussed above. The user can then rotate the carousel 70 of the rotating platform 60 to adjust the angular position of the microphone 26, so that the front of the microphone 26 faces the user or other sound source to be picked up by the microphone 26. Because the resistance of spindle 42 of the rotary encoder 34 to rotation is greater than that of the carousel 70, rotation of the carousel 70 does not impart rotation to the knob 50 or the spindle 42, and thus does not affect the volume setting of the speaker 14.

Integrating the microphone 26 into a device 12 that also performs the function of volume control can eliminate the need to dedicate a separate space on the radio 10 for the microphone 26. Moreover, a volume knob or other protrusion located on the top surface 20 of the radio 10, in general, is an advantageous mounting location for a microphone because such protrusions usually are not covered during normal operation of the radio 10. Also, the ability to accommodate a microphone using space dedicated to another component can allow the use of functions requiring multiple microphones, such as noise cancellation, sound localization, and sound isolation, in applications where spatial constraints would otherwise preclude the use of multiple microphones.

The microphone 26 can be integrated with components other than a volume control knob in alternative embodiments. For example, the microphone 26 can be integrated with a mode-select switch or other protruding features on the radio 10. In other alternative embodiments, the spindle 42 of the rotary encoder 34 can be configured to rotate with the microphone 26, and the output of the rotary encoder 34 can be used to provide an indication of the angular position of the microphone 26.

Figure 16:
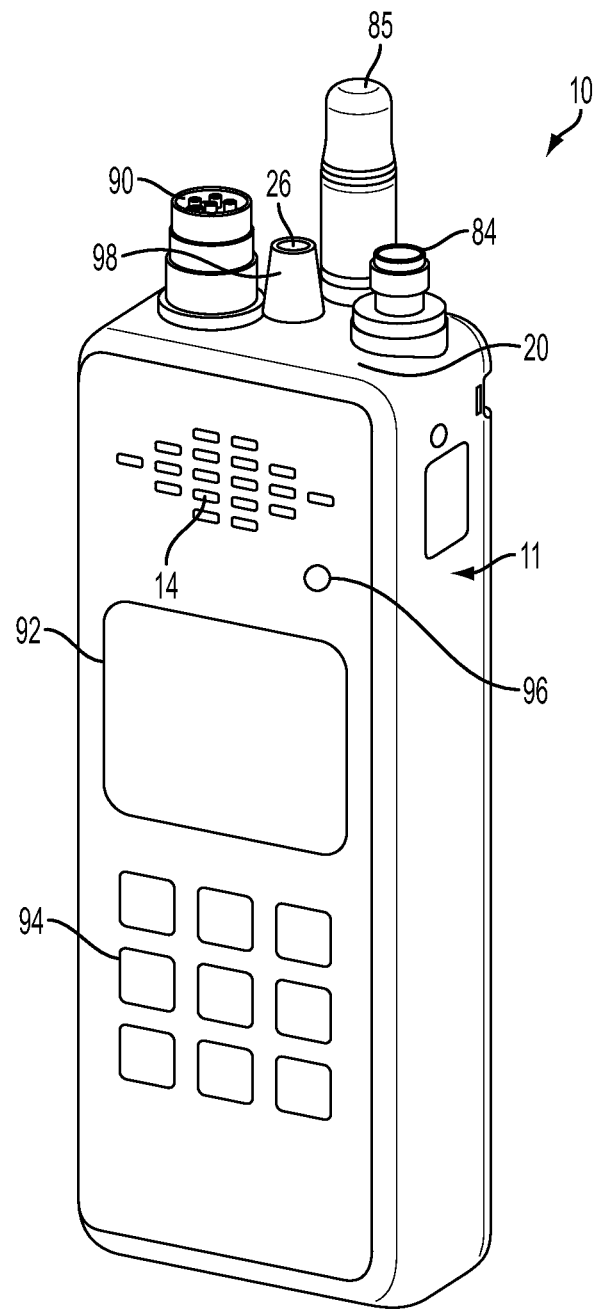
FIG. 16 is a perspective view of the radio shown in FIG. 1, equipped with another alternative embodiment of the integrated volume control and microphone device shown in FIGS. 1-5 in the form of an integrated projection and microphone.

In other alternative embodiments, the microphone 26 can be mounted on a projection having the sole purpose of accommodating the microphone 26. For example, FIG. 16 depicts an alternative embodiment in which an acoustic transducer, such as the microphone 26, is mounted on a projection 98 that extends from the top surface 20 of the shell 11. In other alternative embodiments, one or more of the projection 98 can be formed at other locations on the shell 11 at which it may be critical or otherwise preferable to locate a microphone 26 for noise cancellation or other purposes.

In alternative embodiments that utilize an omnidirectional microphone 26, there is no need to rotate the microphone 26 in relation to the knob 50 or the shell 11 to orient the microphone 26 for optimal pick-up. Thus, the microphone 26 can be mounted directly on the knob 50 in such embodiments, without the use of the rotating platform 60 or other structure that facilitates relative rotational movement between the microphone 26 and the knob 50.

Figure 6:
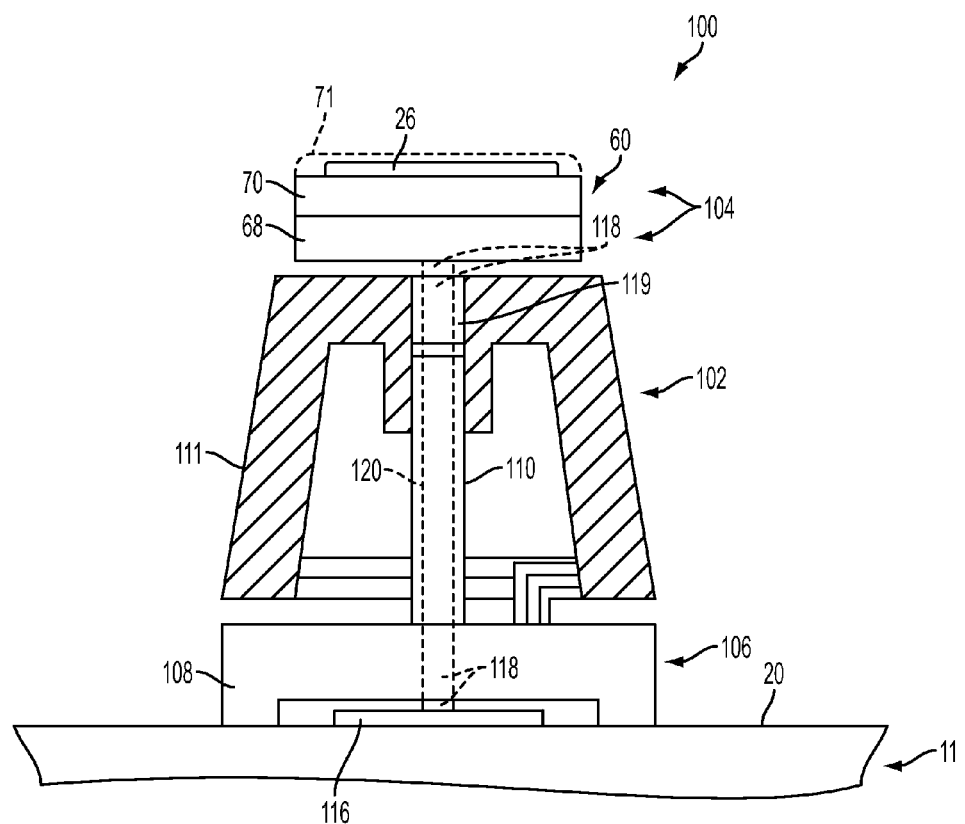
FIG. 6 is a side view of an alternative embodiment of the integrated volume control and microphone device shown in FIGS. 1-5, depicting a knob of the alternative embodiment in cross section.

FIG. 6 depicts an alternative embodiment in the form of an integrated volume control and microphone device 100. Components of the device 100 that are substantially identical to those of the device 12 are denoted in the figures by identical reference characters. The device 100 includes a first portion 102, and a second portion 104. The first portion 102 includes a rotary encoder 106 having a casing 108 and a spindle 110. A first portion of the spindle 110 is disposed for rotation within the casing 108, and a second portion of the spindle 110 extends from the casing 108. The rotary encoder 106 generates an electrical output indicative of the angular position of the spindle 110, in a manner substantially the same as the rotary encoder 34. The first portion 102 of the device 100 also includes a knob 111 securely mounted on the second portion of the spindle 110, so that rotation of the knob 111 imparts a corresponding rotation to the spindle 110.

The second portion 104 of the device 100 includes a base 116 that is securely mounted on the top surface 20 of the shell 11 by a suitable means such as fasteners or epoxy. The second portion 104 also includes a shaft 118 that adjoins the base 116. The shaft 118 extends upwardly though the casing 108 of the rotary encoder 106. The shaft 118 also extends through a channel 120 that is formed within the spindle 110, along the longitudinal axis thereof. The first and second portions 102, 104 of the device 100 are thus disposed in a coaxial configuration. The shaft 118 also extends through a centrally-located hole 119 in the upper portion of the knob 111. The channel 120, the hole 119, and the portion of the shaft 118 extending through the channel 120 are depicted in phantom in FIG. 6.

The rotating platform 60 has an acoustic transducer, such as the microphone 26, mounted thereon as discussed above in relation to the device 12. The rotating platform 60 can be securely mounted on top of the shaft 112 using fasteners or other suitable means. Signals for the microphone 26 are routed between the slip contacts 72 on the base 68 of the rotating platform 60, and the shell 11 of the radio 10 by way of electrically-conductive leads (not shown) that extend along the side of the shaft 118. As a result of the coaxial arrangement of the shaft 118 and the spindle 110, rotation of the knob 111 is not imparted to the rotating platform 60 or the microphone 26, and vice versa. Thus, the volume of the speaker 14 can be adjusted without changing the angular position of the microphone 26, and the orientation of the microphone 26 can be adjusted without changing the volume setting of the radio 10.

Figure 7:
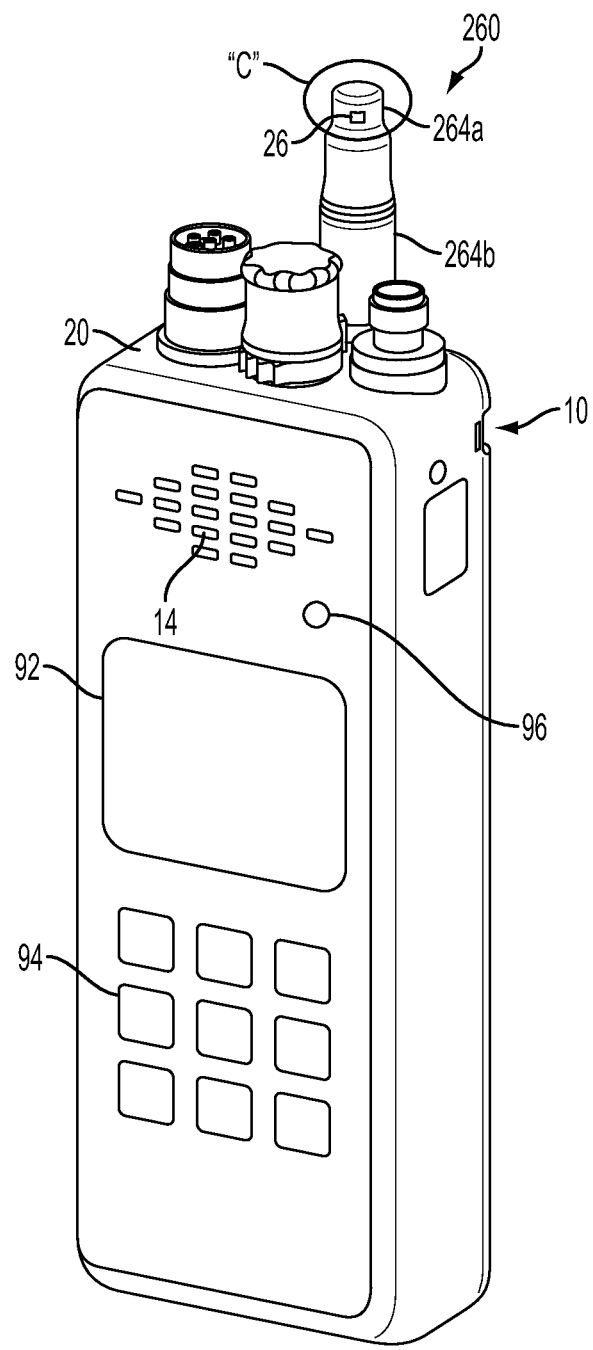
FIG. 7 is a perspective view of the radio shown in FIG. 1, equipped with an antenna having an integrated microphone in lieu of volume control and microphone device shown in FIGS. 1-5.
Figure 8:
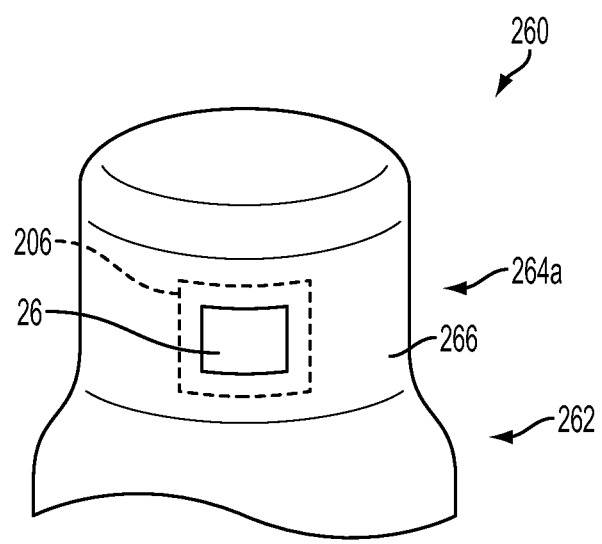
FIG. 8 is a magnified view of the area designated "C" in FIG. 7.

FIGS. 7 and 8 depict another alternative embodiment in which the radio 10 is equipped with a GPS antenna 260. The antenna 260 has an elongated body 262 mounted on the top surface 20 of the radio 10. The body 262 has an upper portion 264a and a lower portion 264b. The lead (not shown) for the antenna 260 is mounted within the lower portion 264b of the body 262. The antenna 260 provides inputs to the GPS module 89 of the radio 10 via the bus 44. An acoustic transducer, such as the microphone 26, is mounted on an outer surface 266 of the upper portion 264a, as shown in FIG. 8. A protective cover 267, similar to the cover 71 of the device 12, is mounted on the outer surface 266 and over the microphone 26. The cover 267 is depicted in phantom in FIG. 8. In alternative embodiments, the microphone 26 can be positioned within an open recess that is formed in the body 202 and extends inwardly from the outer surface 204. In other alternative embodiments, the microphone 26 can be embedded within a cavity formed within the body 202, and sound can be routed to the microphone 26 via an acoustical tube embedded within the body 202, or by other suitable means.

Figure 9:
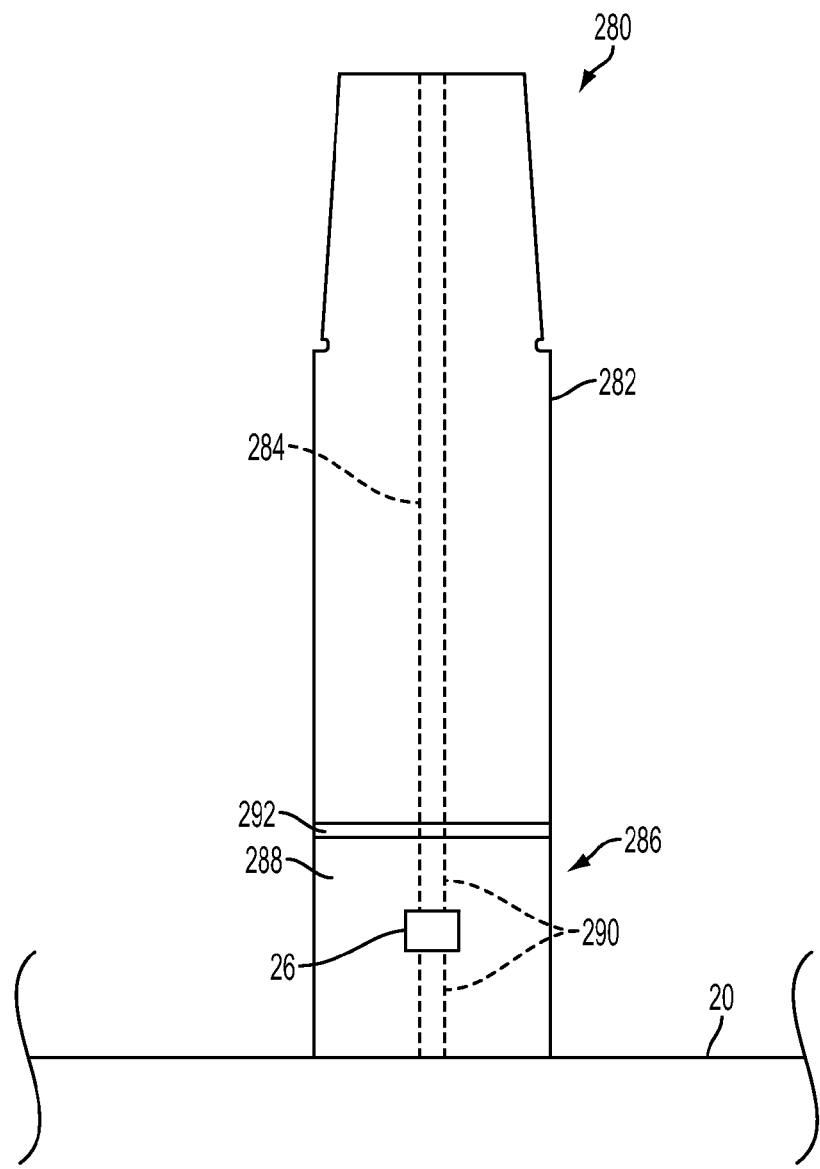
FIG. 9 is a side view of another embodiment of an antenna having an integrated microphone.

FIG. 9 depicts another alternative embodiment in the form of an antenna 280 configured to transmit and receive radio frequency (RF) signals. The antenna 260 provides inputs to, and receives outputs from the transmit and receive module 80 of the radio 10 via the bus 44. The antenna 280 comprises a cover 282 formed from a material such as polyvinyl chloride (PVC) or polyurethane, and a lead 284 embedded in the cover 282. The lead 284 is depicted in phantom in FIG. 9. The antenna 280 also includes a microphone module 286. The microphone module 286 includes a body 288 that adjoins the cover 282, and an acoustic transducer, such as the microphone 26, mounted in a recess formed in an outer surface of the body 288. A shielded feed 290 for the lead 284 extends through the body 288.

The microphone module 286 also includes a shield 292 positioned between the body 288 and the cover 282, to help shield the microphone 26 from RF energy radiated by the lead 284. In alternative embodiments, the microphone 26 can be mounted on the outer surface of the body 288. In other alternative embodiments, the microphone 26 can be embedded in the body 288. Sound can be routed to the microphone 26 via an acoustical tube or other suitable means. The acoustical tube can be embedded within the body 288, and can extend radially outward to the outer surface of the body 288. Alternatively, the acoustical tube can direct sound to the microphone 26 from the top of the antenna 280. The acoustical tube in such an embodiments can be embedded in the cover 282 and the body 288, can extend along the axial, i.e., lengthwise, direction of the antenna 280, and can terminate at or near an upper surface the cover 282.

Figure 10:
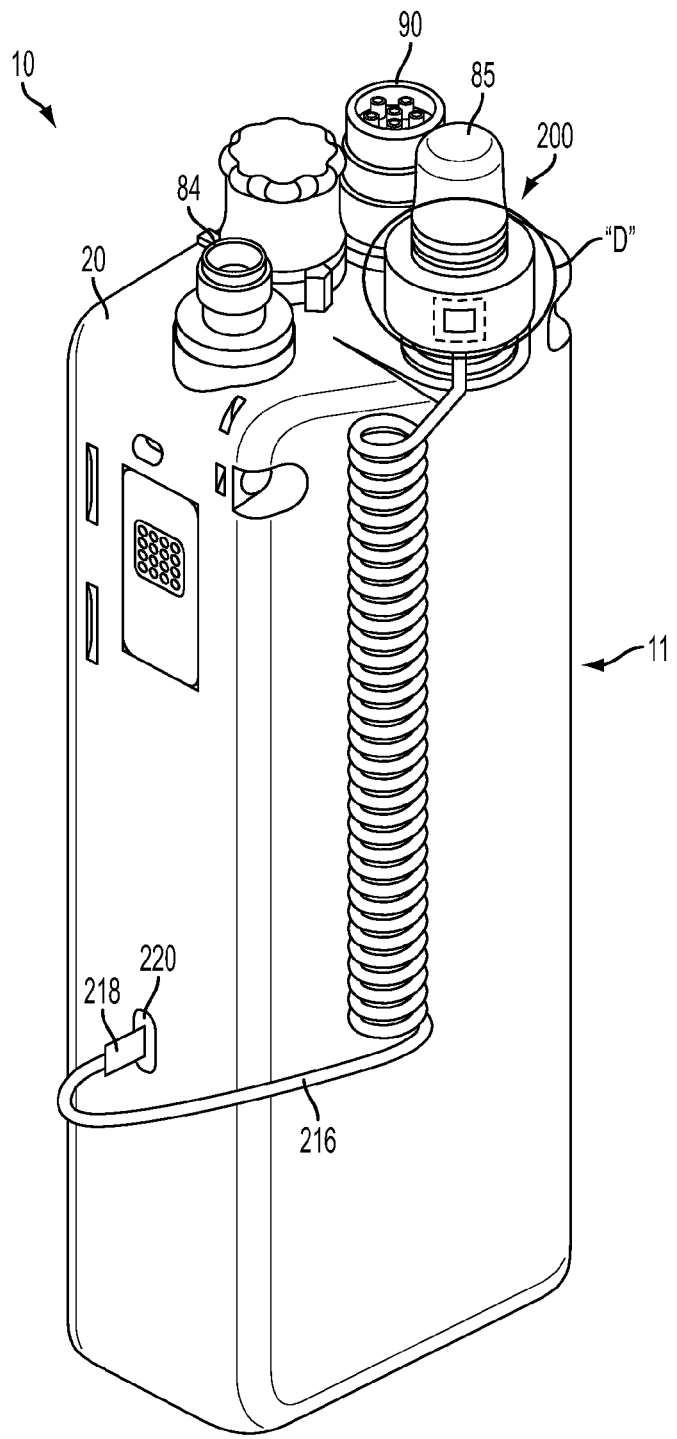
FIG. 10 is a perspective view of the radio shown in FIG. 1, equipped with another alternative embodiment of the integrated volume control and microphone device shown in FIGS. 1-5 in the form of an integrated collar and microphone.
Figure 11:
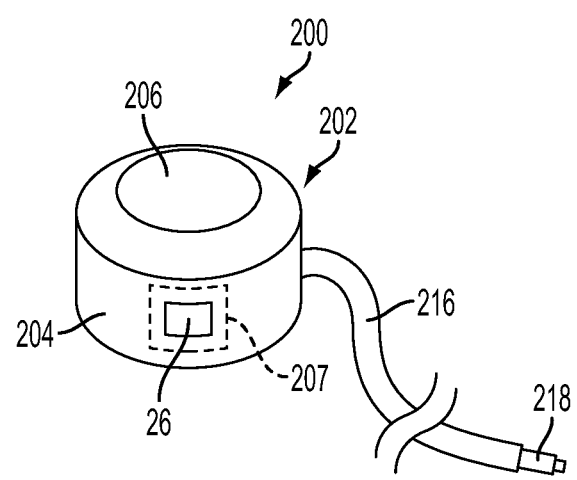
FIG. 11 is a magnified side view of the area designated "D" in FIG. 10, depicting the integrated collar and microphone in an uninstalled condition.

FIGS. 10 and 11 depict another alternative embodiment in the form of a collar 200. The collar 200 comprises a ring-shaped body 202 having an outer surface 204 and an inner surface 206. The collar 200 also includes an acoustic transducer such as the microphone 26. The microphone 26 is mounted on the outer surface 204 of the collar 200. A protective cover 207, similar to the cover 71 of the device 12, can be mounted on the outer surface 204 and over the microphone 26. A suitable marking (not shown) can be placed on the outer surface 204 to indicate the position of the microphone 26 to the user.

In alternative embodiments, the microphone 26 can be positioned within an open recess that is formed in the body 202 and extends inwardly from the outer surface 204. In other alternative embodiments, the microphone 26 can be embedded within a cavity formed within the body 202, and sound can be routed to the microphone 26 via an acoustical tube embedded within the body 202, or other suitable means. In other alternative embodiments, the body 202 and the microphone 26 can be covered with a protective means, such as GORE-TEX fabric, to protect the collar 200 from ingress of water and other contaminants.

The collar 200 is configured to fit over the GPS antenna 85 of the radio 10, as shown in FIG. 10. The collar 200 can be configured to fit over other protrusions or projections formed in, or mounted on the shell 11 in alternative embodiments. The antenna 85 provides inputs to the GPS module 89 of the radio 10 via the bus 44. The GPS module uses the input to determine the position of the radio 10. Alternative embodiments of the collar 200 can be configured to be placed over protruding structures other than the GPS antenna 85. The collar 200 can be retained on the antenna 85 by a suitable means such as an interference, or friction fit. In particular, the diameter of the inner surface 206 of the collar 200 can be selected so that friction between the inner surface 206 and the contacting surface of the antenna 85 is sufficient to prevent the collar 200 from slipping off the antenna 85, but low enough to permit the user to rotate the collar 200 in relation the antenna 85 to place the microphone 26 in an optimum orientation in relation to the sound source being picked up by the microphone 26. Alternatively, a clip or ring (not shown) can be secured to the antenna 85 above the collar 200 after the collar 200 has been placed on the antenna 85, to prevent the collar 200 from disengaging from the antenna 85.

A cable 216 is mechanically connected to the collar 200, as shown in FIGS. 10 and 11. The cable 216 is electrically connected to the microphone 26. A connector, such as a universal serial bus (USB) standard Type A plug connector 218, is connected to the freestanding end of the cable 216 as illustrated in FIG. 10. The connector 218 can be mated with a suitable receptacle connector, such as a USB standard Type A receptacle connector 220, mounted on the radio 10 to communicatively couple the microphone 26 to the radio 10. The collar 200 can thus be retro-fitted to an existing radio, such as the radio 10, or other communication devices with relative ease.

Alternative embodiments of the collar 200 can include multiple microphones 26, for purposes such as beam forming in which sound is to be picked up from a particular direction. Also, in applications where it is not feasible to rotate the collar 200 in relation the antenna 85, multiple microphones 26 can be used to help ensure that a microphone 26 is generally oriented toward the sound to be picked up regardless of the angular position of the antenna 85 in relation to the sound source.

Figure 12:
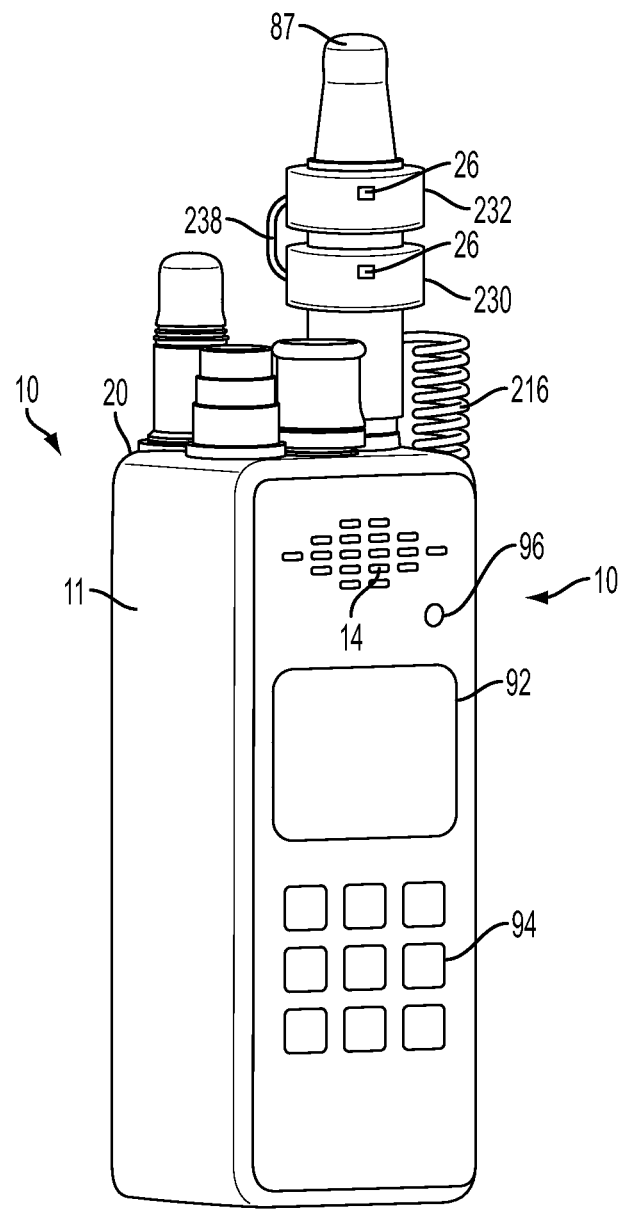
FIG. 12 is a perspective view of the radio shown in FIG. 1, equipped with an alternative embodiment of the integrated collar and microphone shown in FIGS. 10 and 11.
Figure 13:
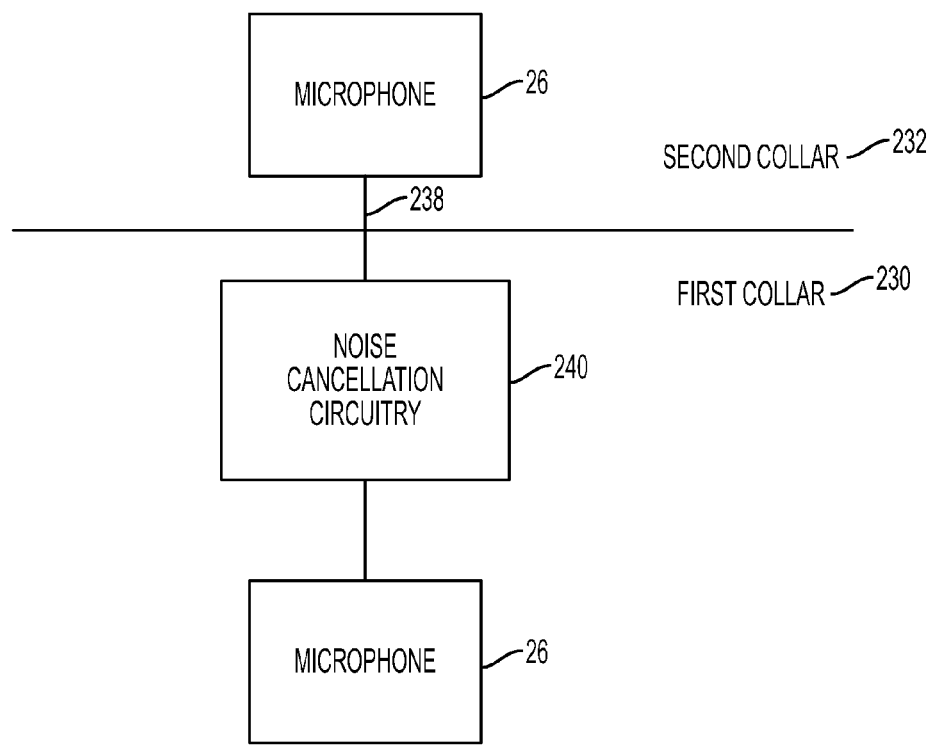
FIG. 13 is a schematic illustration of various electrical components of the integrated collar and microphone shown in FIG. 12.

FIGS. 12 and 13 depict another alternative embodiment in the form of a first collar 230 and a second collar 232. The first and second collars 230, 232 are configured to be positioned around the RF antenna 87 of the radio 10. The antenna 87 provides inputs to, and receives outputs from the transmit/receive module 80 of the radio 10 via the bus 44. The transmit/receive module 80 demodulates and performs other signal processing operations on the inputs it receives from the RF antenna 87. The transmit/receive module 80 also performs modulation and other signal processing operations to generate RF outputs that are transmitted by the antenna 87.

The first collar 230 is substantially similar to the collar 200 described above, with the following exceptions. The first collar 230 is sized to fit over the RF antenna 87 instead of the GPS antenna 85. Also, the first collar 230 includes noise-cancellation circuitry 240 as depicted in FIG. 13. The noise-cancellation circuitry 240 is communicatively coupled to acoustic transducer, i.e., the microphone 26, of the first collar 230 via wiring internal to the first collar 230. The first collar 230 further includes a cable 238, in addition to the cable 216. The cable 238 electrically interconnects the first collar 230 to the second collar 232. Alternative embodiments of the collars 230, 232 can each include multiple microphones 26, as discussed above in relation to the collar 200.

The second collar 232 is substantially similar to the collar 200 described above, with the exception that the second collar 232 does not include a cable 216, or noise-cancellation circuitry 240. The microphone 26 of the second collar 232 is communicatively coupled to the noise-cancellation circuitry 240 of the first collar 230 via the cable 216. Alternative embodiments of the collars 230, 232 can each include multiple microphones 26, as discussed above in relation to the collar 200.

The noise-cancellation circuitry 240 can be configured to perform the noise-cancellation function by any suitable technique. For example, the microphone 26 of the first collar 230 can be treated as a primary microphone, i.e., the microphone positioned closest to the user's mouth or other audio source that the user wishes to be picked-up. The output the secondary microphone 26 of the second collar 232 will generally reflect a higher percentage of background noise, and a lower percentage of the audio source that the user wishes to be picked-up in comparison to the primary microphone 26 of the first collar 230. Thus, by generating an output that represents the difference between the outputs of the primary and secondary microphones, the noise-cancellation circuitry 240 can eliminate some of the background noise incident upon the primary microphone 26. Additional information relating to noise-cancellation techniques can be found in pending U.S. patent application Ser. No. 12/403,646, filed Mar. 13, 2009, the contents of which is incorporated by reference herein in its entirety.

The user can adjust the relative positions of the first and second collars 230, 232 by moving the first and second collars 230, 232 up or down the antenna 87. For example, the user can adjust the relative positions of the first and second collars 230, 232 to maximize the physical separation between the secondary microphone 26 in the first collar 230 and the primary microphone 26 in the second collar 232, to increase the effectiveness of the noise-cancellation circuitry 240.

The first and second collars 230, 232 are equipped with provisions to shield the microphones 26 and other circuitry therein from the RF energy radiated by the antenna 87 when the radio 10 is transmitting. For example, a suitable shield (not shown) can be positioned around the inner circumference of the body of each of the first and second collars 230, 232. Alternatively, the shielding can be integrated into each of the bodies, or the bodies themselves can be formed from a material, such as copper or silver-plated copper, that provides a shielding effect.

Figure 14:
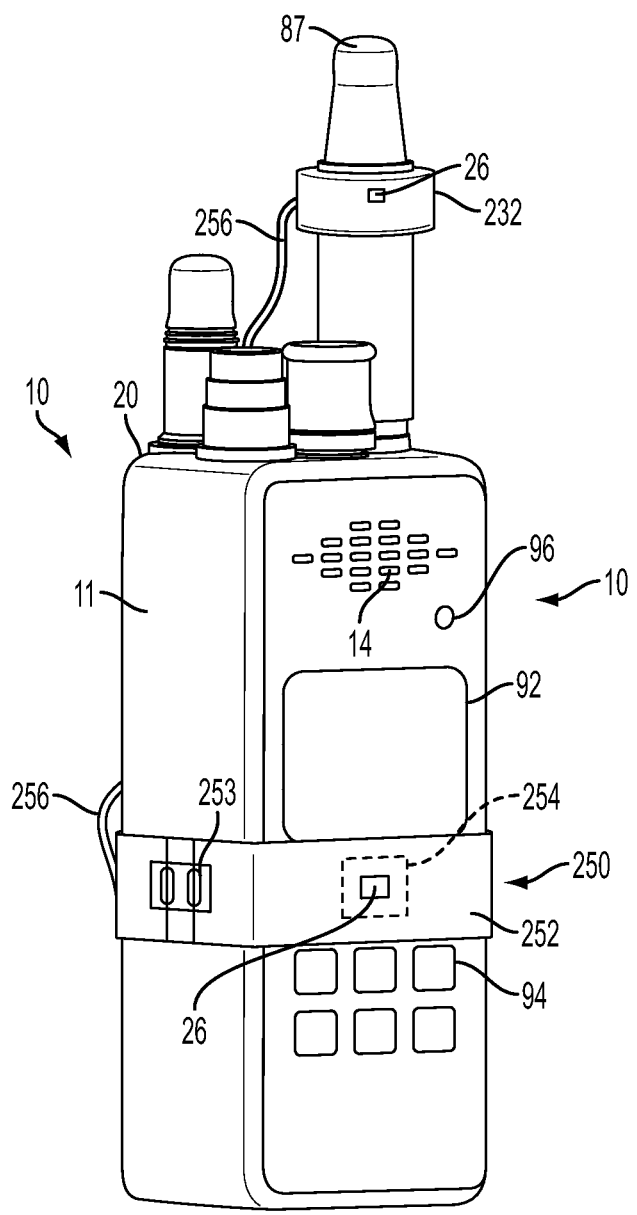
FIG. 14 is a perspective view of the radio shown in FIG. 1, equipped with another alternative embodiment of the integrated collar and microphone shown in FIGS. 10 and 11.

FIG. 14 depicts an alternative embodiment of the system shown in FIGS. 12 and 13. In the embodiment of FIG. 14, a collar 250 is used in lieu of the first collar 230 of the embodiment of FIG. 12. The collar 250 includes a strap 252. The collar 250 also includes an acoustic transducer, such as the microphone 26, and noise-cancellation circuitry 240 mounted on the strap 252, within a protective enclosure 254. The enclosure 254 is depicted in phantom in FIG. 14. The microphone 26 of the collar 250 can be used as a primary microphone for the purpose of noise cancellation, and the microphone 26 of the second collar 232 can be used as a secondary microphone as discussed above in relation to the first and second collars 230, 232. In other alternative embodiments, a second collar 250 can be used in lieu of the second collar 232.

The strap 252 is configured to be positioned around the shell 11 of the radio 10 as depicted in FIG. 14. The strap 252 can include a slider 253 or other suitable means for adjusting the length of the strap 252 to optimally fit the shell 11. The collar 250 can also include a cable 256 that electrically connects the noise-cancellation circuitry 240 to the microphone 26 of the second collar 232. The collar 250 also includes a cable and connector (not shown), such as the cable 216 and connector 218 of the collars 200, 230, to electrically connect the collar 250 to the radio 10. Because the collar 250 can be placed around the shell 11 of the radio 10, the spacing between the microphones 26 of the collar 250 and the second collar 232 can be greater than that between the microphones 26 of the first and second collars 230, 232 mounted on the antenna 87. Increasing the spacing between the microphones 26 of the collar 250 and the second collar 232 in this manner can potentially increase the effectiveness of the noise cancellation provided by the noise-cancellation circuitry 240.

Figure 15:
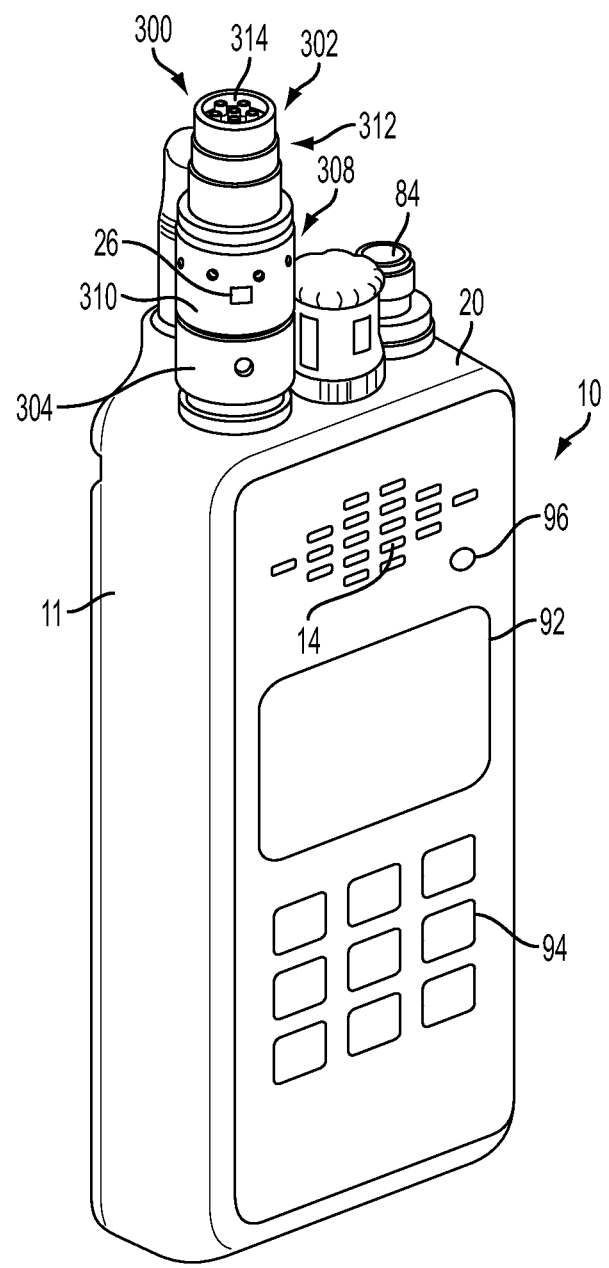
FIG. 15 is a perspective view of the radio shown in FIG. 1, equipped with another alternative embodiment of the integrated volume control and microphone device shown in FIGS. 1-5 in the form of an integrated input/output jack and microphone.

FIG. 15 depicts another alternative embodiment in the form of an adapter 300 configured to mate with the input/output jack 90 of the radio 10. The input/output jack 90 is configured to mate with, for example, an accessory connector (not shown). The input/output jack 90 is covered by the adapter in FIG. 15; the input/output jack 90 is visible in the embodiment depicted in FIG. 1. The adapter 300 includes a body 302. A lower portion 304 of the body 302 is configured with pins (not shown) that each mate a corresponding receptacle of the input/output jack 90.

The body 302 includes an intermediate portion 308. An acoustic transducer, such as the microphone 26, can be mounted on an outer surface 310 of the intermediate portion 308. A protective cover (not shown) similar to the cover 71 of the device 12 is mounted on the outer surface 310, over the microphone 26. In alternative embodiments, the microphone 26 can be positioned within an open recess that is formed in the intermediate portion 308 and extends inwardly from the outer surface 310. In other alternative embodiments, the microphone 26 can be embedded within a cavity formed within the intermediate portion 308, and sound can be routed to the microphone 26 via an acoustical tube embedded within the intermediate portion 308, or by other suitable means. Signals from the microphone 26 can be routed to the radio 10 via one of the pins of the lower portion 304.

The body 302 further includes an upper portion 312. The upper portion 312 includes a receptacle 314 configured to mate with the accessory connector.

What is claimed is:

1. An electronic device, comprising:
   a shell;
   a rotary control input device comprising first and second minipulable portions that rotate independent of each other in relation to the shell and are co-located so as to be disposed over a common location of or a common aperture formed through the shell throughout use thereof, where
      rotation of the first minipulable portion controls first operations of the electronic device, and
      rotation of the second minipulable portion causes an adjustment of an acoustic transducer's orientation in relation to a sound source; and
   the acoustic transducer disposed on or in the second minipulable portion of the rotary control input device so as to be rotatable with the second minipulable portion of the rotary control in relation to the shell.

2. The device of claim 1, further comprising:
   a speaker; and
   an amplifier communicatively coupled to the rotary control input device and the speaker, where the amplifier generates an electrical output that drives the speaker in response to an output of the rotary control input device.

3. The device of claim 1, wherein the first minipulable portion comprises a knob fixed transmitting a rotational input to the rotary control input device.

4. The device of claim 3, wherein the rotary control input device comprises a spindle, the knob rotates with a first end of the spindle, and the output of the rotary control input device is representative of an angular position of the spindle.

5. The device of claim 4, wherein the rotary control input device is a rotary encoder comprising the spindle, a casing fixed to the shell, a disc positioned for rotation within the casing, and a plurality of contacts positioned within the casing the plurality of contacts contact the disc on a selective basis dependent upon an angular position of the spindle in relation to the casing.

6. The device of claim 3, wherein the acoustic transducer is mounted on the knob.

7. The device of claim 6, wherein the acoustic transducer is configured to rotate in relation to and independent of the knob.

8. The device of claim 7, further comprising:
   a rotating platform having a base; and
   a carousel rotatable in relation to the base;
   wherein the acoustic transducer rotates with the carousel.

9. The device of claim 8, wherein the base rotates with the knob.

10. The device of claim 4, further comprising
    a shaft fixed to the shell and extending through the spindle and the knob;
    wherein the base of the rotating platform is fixed to the shaft.

11. An electronic device, comprising:
    a shell; and
    an input device mounted on or extending through the shell, the input device comprising
       a first minipulable portion generating an output that causes a response in a component of the electronic communication device, and
       a second minipulable portion mounted on or coaxially with the first minipulable portion and comprising a first acoustic transducer having an orientation relative to a sound source that is adjustable via rotation of the second minipulable portion;
    wherein the first and second minipulable portions rotate independent of each other in relation to the shell and are co-located so as to be disposed over a common location of or a common aperture formed through the shell throughout use thereof.

12. The electronic device of claim 11, wherein
    the electronic device further comprises a speaker,
    the component of the electronic device in which the response is caused is an amplifier generating an electrical output that drives the speaker, and
    the first minipulable portion of the input device comprises a control communicatively coupled to the amplifier and generating an output in response a rotational input to the control.

13. The electronic device of claim 11, wherein the first minipulable portion comprises a knob transmitting a rotational input to a rotary control.

14. The electronic device of claim 13, wherein
    the rotary control further comprises a spindle,
    the knob rotates with a first end of the spindle, and
    the rotary control is responsive to changes in an angular position of the spindle.

15. The electronic device of claim 14, wherein the rotary control is a rotary encoder comprising the spindle, a casing fixed to the shell, a disc positioned for rotation within the casing, and a plurality of contacts positioned within the casing the plurality of contacts contact the disc on a selective basis dependent upon an angular position of the spindle in relation to the casing.

16. The electronic device of claim 13, wherein the first acoustic transducer is mounted on the knob.

17. The electronic device of claim 16, wherein the first acoustic transducer rotates in relation to and independent of the knob.

18. The electronic device of claim 17, further comprising;
    a rotating platform having a base, and
    a carousel rotatable in relation to the base;
    wherein the first acoustic transducer rotates with the carousel.

19. The electronic device of claim 18, wherein the base rotates with the knob.

20. The electronic device of claim 13, further comprising a shaft fixed to the shell and extending through the spindle and the knob, where the base of the rotating platform is fixed to the shaft.

21. The electronic device of claim 11, wherein the first minipulable portion is an antenna.

22. The electronic device of claim 21, wherein the second minipulable portion further comprises a collar mounted on the antenna where the first acoustic transducer is mounted on the collar.

23. The electronic device of claim 22, wherein the collar is ring-shaped and has a centrally-located opening configured to receive the antenna.

24. The electronic device of claim 22, wherein the collar comprises a cable and a connector, the connector electrically and mechanically connected to the cable and mates with another connector on the electronic device.

25. The electronic device of claim 22, wherein the second minipulable portion further comprises
a second collar mounted on the antenna,
a second acoustic transducer mounted on the second collar, and
noise-cancellation circuitry communicatively coupled to the first and second acoustic transducers and operable to reduce background noise present in an output of the second acoustic transducer.

26. The electronic device of claim 22, further comprising;
a band positioned around the shell; and
a second acoustic transducer mounted on the band.

27. The electronic device of claim 26, further comprising noise-cancellation circuitry communicatively coupled to the microphones and reducing background noise present in an output of the second acoustic transducer.

28. The electronic device of claim 21, wherein the first acoustic transducer is mounted directly on the antenna.

29. The electronic device of claim 28, wherein the first acoustic transducer is embedded within a cover or a body of the antenna, and the antenna further comprises an acoustical tube in acoustic communication with the first acoustic transducer and an ambient environment around the antenna.

30. The electronic device of claim 11, wherein the first minipulable portion comprises an input/output jack of the electronic device.

31. The electronic device of claim 30, wherein the first minipulable portion further comprises an adapter mating with the input/output jack and a connector.

32. A radio, comprising:
a shell;
an input device comprising first and second minipulable portions that rotate independent of each other in relation to the shell and are co-located so as to be disposed over a common location of or a common aperture formed through the shell throughout use thereof, where:
the first minipulable portion comprises
a rotary control that generates an electrical output responsive to a rotational input thereto, and
a knob mounted on the rotary control which provides the rotational input to the rotary control; and
the second minipulable portion comprises an acoustic transducer such that rotation of the second minipulable portion causes an adjustment of the acoustic transducer's orientation relative to a sound source; and
a rotating platform having a base and a carousel rotatable in relation to the base and the rotary control, where the acoustic transducer rotates with the carousel;
a speaker mounted on or within the shell; and
an amplifier communicatively coupled to the first minipulable portion of the input device and the speaker, where the amplifier generates an electrical output that drives the speaker in response to an electrical output of the first minipulable portion of the input device.

33. The radio of claim 32, wherein the base of the rotating platform rotates with the knob.

34. The radio of claim 32, wherein
the rotary control is a rotary encoder comprising a spindle and a shaft extending through the spindle and the knob, and
the base of the rotating platform is fixed to the shaft.

* * * * *